United States Patent [19]

Watanabe et al.

[11] Patent Number: 5,266,618
[45] Date of Patent: Nov. 30, 1993

[54] FLAME-RETARDANT RESIN COMPOSITION

[75] Inventors: Jun Watanabe; Noriaki Kudo, both of Tokyo, Japan

[73] Assignee: Denki Kagaku Kogyo Kabushiki Kaisha, Tokyo, Japan

[21] Appl. No.: 890,089

[22] Filed: May 28, 1992

[30] Foreign Application Priority Data

May 28, 1991 [JP] Japan .................................. 3-150915
Jul. 2, 1991 [JP] Japan .................................. 3-186947

[51] Int. Cl.$^5$ .......................... C08J 5/10; C08K 3/38; C08L 69/00
[52] U.S. Cl. .................................. 524/405; 524/139; 524/140; 524/141; 524/265; 524/404; 524/432; 524/504; 524/537
[58] Field of Search ............... 524/265, 139, 140, 141, 524/432, 504, 537, 404, 405

[56] References Cited

U.S. PATENT DOCUMENTS 4,269,762  5/1981  Thomas ........................ 260/45.7
4,927,870  5/1990  Ogoe et al. ...................... 524/140
4,946,885  8/1990  Weil et al. ...................... 524/415
5,002,996  3/1991  Okuda et al. .................... 524/436
5,061,745 10/1991  Wittmann et al. ................ 524/139

FOREIGN PATENT DOCUMENTS 0360015  3/1990  European Pat. Off. .
0364729  4/1990  European Pat. Off. .

*Primary Examiner*—Paul R. Michl
*Assistant Examiner*—U. K. Rajguru
*Attorney, Agent, or Firm*—Oblon, Spivak, McClelland, Maier & Neustadt

[57] ABSTRACT

A flame-retardant resin composition comprising the following components (A), (B), (C) and (D): (A) 100 parts by weight of a thermoplastic resin comprising ① a polycarbonate resin, or ② a polycarbonate resin and a non-polycarbonate resin, (B) from 0.1 to 40 parts by weight of a phosphorus compound, (C) from 0.001 to 40 parts by weight of a boron compound, and (D) from 0.01 to 5 parts by weight of a polyorganosiloxane and/or from 0.001 to 5 parts by weight of a fluorine resin.

9 Claims, No Drawings

FLAME-RETARDANT RESIN COMPOSITION

The present invention relates to a flame-retardant resin composition. More particularly, it relates to a flame-retardant resin composition having a flame-retardant comprising a phosphorus compound, a boron compound and a polyorganosiloxane and/or a fluorine resin incorporated to a resin which contains at least a polycarbonate resin as one component.

Polycarbonate resins are widely employed industrially, since they have excellent mechanical properties and thermal characteristics. However, there is a problem that they are inferior in the moldability. Therefore, a number of polymer blends with other thermoplastic resins have been developed. Among them, a polymer blend with an acrylonitrile-butadiene-styrene resin (ABS resin) or a polyester resin, is widely used in the automobile field, the office appliances field, the electronic and electrical field, etc. Especially in the office appliances field and the electronic and electrical field, flame retardancy is required in addition to the mechanical properties, etc. in many cases.

Heretofore, in order to improve the flame retardancy of a resin containing a polycarbonate resin, a halogen-containing compound, a phosphorus compound or antimony trioxide has been mainly used as a flame-retardant component.

As methods for evaluating the flame retardancy of a thermoplastic resin, there are a combustion method stipulated in Under Lighters Laboratory UL-94, and an oxygen index method stipulated in JIS K-7201. Usually, the flame retardancy of a resin is evaluated based on these evaluation methods.

When a halogen compound is incorporated as a flame-retardant to a synthetic resin, the flame-retarding effect is relatively high, but noxious or hazardous substances will be produced during the incineration treatment or at the outbreak of fire, whereby human life will be endangered, or emergency activities or fire extinguishing activities will be difficult, or an environmental pollution is likely to be brought about. Therefore, it is desired to develop a flame-retardant resin which contains no halogen compound or which has a relatively small amount of a halogen compound.

When it is attempted to impart flame-retardancy to a synthetic resin by means of a phosphorus compound, the fire retarding effect is relatively low as compared with a halogen compound, whereby no adequate flame-retardancy can be obtained, or the amount of its incorporation will have to be large to obtain adequate flame-retardancy, whereby the heat resistance or mechanical properties of the resulting flame-retardant resin tend to be poor.

U.S. Pat. No. 4,927,870 discloses an ignition resistant composition comprising (A) a carbonate polymer and/or a non-carbonate polymer, (B) a high elastic memory polytetrafluoro-ethylene, (C) an organic phosphate and (D) a metal salt of an inorganic acid. However, this patent discloses only metal bisulfates or sulfates as the useful organic acid metal salts. In this patent, there is no disclosure which teaches or suggests that the flame-retardancy can further be improved by using a boric acid compound. An Example of this patent indicates that when a polymer blend of a polycarbonate (PC) and ABS containing triphenyl phosphate and polytetrafluoroethylene, contains sodium sulfate as the metal salt of an inorganic acid, the limiting oxygen index (LOI) is merely at a level of 26.5. Whereas, the present invention presents a resin composition having a high level of flame retardancy with a LOI value of at least 30.

U.S. Pat. No. 5,061,745 discloses a flame-retardant composition comprising a polycarbonate, a graft polymer (such as ABS), a thermoplastic copolymer, a phosphorus compound and tetrafluoroethylene. In the Examples of this patent, ABS is used as the graft polymer, whereby UL94 test shows a rating of V-0. However, such a resin composition has a drawback that the flexural modulus of elasticity is low.

The present inventors have studied these compositions, and as a result, have found it possible to obtain a resin composition which has good flame-retardancy and impact resistance and which also has excellent flexural modulus of elasticity, by incorporating a boron compound.

Namely, the present inventors have conducted extensive researches to present a flame-retardant resin composition which contains no or little chlorine or bromine, and as a result, have found that an excellent flame-retarding effect can be obtained by incorporating a phosphorus compound, a boron compound and a polyorganosiloxane and/or a fluorine resin to a thermoplastic resin containing at least a polycarbonate resin as one component. The present invention has been accomplished on the basis of this discovery.

Thus, the present invention provides a flame-retardant resin composition comprising the following components (A), (B), (C) and (D):

(A) 100 parts by weight of a thermoplastic resin comprising ① a polycarbonate resin, or ② a polycarbonate resin and a non-polycarbonate resin, (B) from 0.1 to 40 parts by weight of a phosphorus compound, (C) from 0.001 to 40 parts by weight of a boron compound, and (D) from 0.01 to 5 parts by weight of a polyorganosiloxane and/or from 0.001 to 5 parts by weight of a fluorine resin.

Now, the present invention will be described in detail with reference to the preferred embodiments.

The flame-retardant resin composition of the present invention contains a phosphorus compound and a boron compound as essential components, and by the combined use of these two components, an excellent flame-retarding effect can be obtained. However, a known flame-retarding additive which is commonly employed, can be used in combination.

Further, by the incorporation of a polyorganosiloxane and/or a fluorine resin, it is possible to prevent dropping of the molten resin at the time of combustion, and a better flame-retarding effect can be obtained.

The polycarbonate resin to be used in the present invention, is the one produced by reacting a bivalent phenol and a carbonate precursor by a solution method or a melting method. Typical examples of the bivalent phenol include 2,2-bis(4-hydroxyphenyl)propane (bisphenol A), bis(4-hydroxyphenyl)methane, 1,1-bis(4-hydroxyphenyl)ethane, 2,2-bis(4-hydroxy-3,5-dimethylphenyl)propane, 2,2-bis(4-hydroxy-3,5-dibromophenyl)propane, 2,2-bis(4-hydroxy-3-methylphenyl)propane, bis(4-hydroxyphenyl)sulfide, and bis(4-hydroxyphenyl) sulfone. A preferred bifunctional phenol is a bis(4-hydroxyphenyl)alkane, particularly bisphenol A as the main material. The carbonate precursor may be carbonyl halide, carbonyl ester or a haloformate. Specifically, it includes phosgene, diphenyl carbonate, a dihaloformate of a bivalent phenol and a mixture thereof. For the preparation of a polycarbonate resin, at least one member selected from these bivalent phenols can be used. Further, two or more polycarbonate resins thus obtained may be used in combination as a mixture.

In the present invention, it is essential to use a polycarbonate resin as component (A). When the polycarbonate resin is used alone, the flame-retardancy and the flexural modulus of elasticity are particularly good. However, it is advisable to mix a thermoplastic resin other than a polycarbonate resin to improve the impact strength.

As the resin other than a polycarbonate resin i.e. the non-polycarbonate resin to be used in the present invention, any thermoplastic resin may be effectively used without any particular restriction. Typical examples thereof include a polystyrene resin, an ABS resin, a polyester resin and a polyamide resin, as well as polyethylene, polypropylene, polybutene, polysulfone, polyvinyl acetate, an ethylene-vinyl acetate copolymer, polymethyl methacrylate, a polyoxymethylene, cellulose acetate and cellulose nitrate. Two or more of these resins may be used in combination.

The polystyrene resin useful in the present invention is a polymer obtained by polymerizing an unsaturated monomer containing an aromatic vinyl monomer and further includes a polymer obtained by modifying such a polymer with an elastomer. As the aromatic vinyl monomer used as an unsaturated monomer, styrene, α-methylstyrene or a halostyrene may be mentioned. Further, together with such a monomer, at least one monomer selected from the group consisting of (meth)acrylic acid, (meth)acrylates, maleimide monomers and unsaturated dicarboxylic acid anhydride monomers, can be used. The (meth)acrylates include, for example, methyl acrylate, ethyl acrylate, methyl methacrylate and ethyl methacrylate. The maleimide monomers include, for example, maleimide, N-methylmaleimide, N-ethylmaleimide, N-propylmaleimide, N-hexylmaleimide, N-cyclohexylmaleimide and N-phenylmaleimide. Maleic anhydride may be mentioned as an unsaturated dicarboxylic acid anhydride monomer. There is no particular restriction as to the method for producing the polystyrene resin, and a conventional method such as bulk polymerization, solution polymerization, suspension polymerization or emulsion polymerization, may be employed.

Polystyrene resins preferably used in the present invention include, for example, polystyrene, high impact polystyrene, a styrene/methyl methacrylate copolymer, a styrene/methacrylic acid copolymer, a styrene/maleic anhydride copolymer and an elastomer-modified product thereof.

The ABS resin useful in the present invention is a graft polymer obtained by graft-polymerizing a vinyl monomer containing an aromatic vinyl monomer to an elastomer and further includes a blend product of such a graft polymer and a polymer obtained by polymerizing a vinyl monomer containing an aromatic vinyl monomer.

The graft polymer is obtained by graft polymerizing an aromatic vinyl monomer and at least one monomer selected from the group consisting of (meth)acrylonitrile, (meth)acrylates, maleimide monomers and unsaturated dicarboxylic acid anhydride monomers, to an elastomer having a glass transition temperature of not higher than 10° C. The aromatic vinyl monomers include, for example, styrene, α-methylstyrene and a halostyrene. The (meth)acrylates include, for example, methyl acrylate, ethyl acrylate, methyl methacrylate and ethyl methacrylate. The maleimide monomers include, for example, maleimide, N-methylmaleimide, N-ethylmaleimide, N-propylmaleimide, N-hexylmaleimide, N-cyclohexylmaleimide and N-phenylmaleimide. Maleic anhydride may be mentioned as an unsaturated dicarboxylic acid anhydride monomer. These monomers may also be used in combination of two or more of them. There is no particular restriction as to the method for producing the graft polymer, and a conventional method such as bulk polymerization, solution polymerization, suspension polymerization or emulsion polymerization may be employed. The monomers preferably employed for the graft polymer to be used in the present invention are styrene and acrylonitrile and/or methyl methacrylate.

The elastomer useful for the graft polymer include, for example, a butadiene elastomer, an acrylic elastomer, an ethylene-propylene elastomer and a silicone elastomer. As the butadiene elastomer, a polybutadiene, a butadiene-styrene copolymer or a butadiene-acrylonitrile copolymer may, for example, be used. As the acrylic elastomer, an elastomer obtained by homopolymerization of an acrylate monomer such as ethyl acrylate, butyl acrylate or 2-ethylhexyl acrylate or by copolymerization of such a monomer as the main component with other copolymerizable monomer, may be employed. The ethylene-propylene elastomer preferably has an ethylene to propylene ratio within a range of from 80:20 to 60:40 and may further contain a diene component. The silicone elastomer is preferably a polyorganosiloxane elastomer having mainly repeating units of dimethylsiloxane. Further, a composite elastomer comprising a silicone elastomer component and an acrylic elastomer component, or a composite elastomer comprising a butadiene elastomer component and an acrylic elastomer component, may also be used. There is no particular restriction as to the method for producing an elastomer, and a conventional method such as bulk polymerization, solution polymerization, suspension polymerization or emulsion polymerization may be employed. In the present invention, a butadiene based elastomer polymer is preferably employed.

For the polymer to be blended with the graft polymer, a monomer useful for the above graft polymer, can be employed. There is no particular restriction as to the method for the production of this polymer, and a conventional method such as bulk polymerization, solution polymerization, suspension polymerization or emulsion polymerization may be employed. Polymers preferably employed as the polymer to be blended with the graft polymer used in the present invention, include, for example, an α-methylstyrene/acrylonitrile copolymer, a styrele/acrylonitrile copolymer, an α-methylstyrene/methyl methacrylate copolymer, a styrene/methyl methacrylate copolymer, an α-methylstyrene/acrylonitrile/N-phenylmaleimide copolymer and a styrene/acrylonitrile/N-phenylmaleimide copolymer.

When a non-polycarbonate thermoplastic resin is used in combination with the polycarbonate resin in the present invention, the weight ratio of the polycarbonate resin/the non-polycarbonate thermoplastic resin is preferably from 100/0 to 50/50, more preferably from 100/0 to 70/30, in view of the frame-retardancy and the flexural modulus of elasticity.

Further, in order to impart a high level of impact strength to the resin composition, it is effective to use the above mentioned ABS resin. The weight ration of the polycarbonate resin/the ABS resin is preferably from 95/5 to 50/50.

In the resin composition capable of presenting well balanced physical properties such as the flame-retardancy, the impact strength and the flexural modulus of elasticity, the weight ratio of the polycarbonate resin/the ABS resin is usually within a range of from 95/5 to 70/30.

The phosphorus compound to be used in the present invention is not particularly limited so long as it is a compound having a phosphorus atom. Typical examples include phosphoric acid esters such as trimethyl phosphate, triethyl phosphate, tributyl phosphate, tri(2-ethylhexyl) phosphate, tributoxyethyl phosphate, trioleil phosphate, tripheyl phosphate, tricresyl phosphate, tryxylenyl phosphate, tris(isopropylphenyl) phosphate, tris(o-phenylphenyl) phosphate, tris(p-phenylphenyl) phosphate, trinaphtyl phosphate, cresyldiphenyl phosphate, xylenyldiphenyl phosphate, diphenyl(2-ethylhexyl) phosphate, di(isopropylphenyl)-phenyl phosphate, o-phenylphenyldicresyl phosphate, dibutyl phosphate, monobutyl phosphate, di(2-ethylhexyl) phosphate, monoisodecyl phosphate, 2-acryloyloxyethylacid phosphate, 2-methacryloyloxyethylacid phosphate, diphenyl-2-acryloyloxyethyl phosphate and diphenyl-2-methacryloyloxyethyl phosphate, and halogen-containing phosphoric acid esters such as tris(2,3-dibromopropyl) phosphate, tris(2-chloroethyl) phosphate, tris(dichloropropyl) phosphate, tris($\beta$-chloropropyl) phosphate, tris(tribromophenyl) phosphate, tris(dibromophenyl) phosphate, tris(tribromoneopentyl) phosphate and a halogen substituted aryl phosphate.

Phosphorous acid esters include triphenyl phosphite, trisnonylphenyl phosphite, tristridecyl phosphite and dibutyl hydrodiene phosphite.

As other phosphorus comounds, triphenylphosphine oxide, tricresylphosphine oxide, diphenyl methane phosphonate, diethyl phenyl phosphonate and red phosphorus may, for example, be mentioned. The red phosphorus may be of a pure product or may be the one stabilized by a usual method. These phosphorus compounds may be employed alone or in combination as a mixture of two or more of them.

The boron compound to be used in the present invention is not particularly limited so long as it is a compound having a boron atom. Typical examples include boric acid, boron oxide and borates. The borates include zinc borates such as zinc tetraborate, zinc metaborate and basic zinc borate, barium borates such as barium orthoborate, barium metaborate, barium diborate and barium tetraborate, lead borate, cadmium borate and magnesium borate. Such boron compounds may be used alone or in combination as a mixture of two or more of them.

The polyorganosiloxane to be used in the present invention is not particularly limited so long as it has a

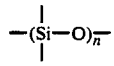

backbone in the molecular structure. Polyorganosiloxanes to be used in the present invention include, for example, polydimethylsiloxane, polymethylphenylsiloxane, an amino-modified silicone, a melcapt-modified silicone and an epoxy-modified silicone. These polyorganosiloxanes may be used alone or in combination as a mixture of two or more of them. Such polyorganosiloxanes may have a wide range of molecular weight of from a few hundred to a few millions, and they may be in any form i.e. in the form of an oil, a varnish, a resin, etc.

The fluorine resin to be used in the present invention includes, for example, polytetrafluoroethylene, a tetrafluoroethylene-hexafluoropropylene copolymer, a tetrafluoroethylene-perfluoroalkylvinylether copolymer, a tetrafluoroethylene-ethylene copolymer, polytrifluorochloroethylene and polyvinylidene fluoride. Preferably, polytetrafluoroethylene is employed. The fluorine resin may be in any form i.e. in the form of emulsion, suspension, microfibril, powder or granules.

The amount of the polyorganosiloxane and/or the fluorine resin to be used in the flame-retardant resin composition of the present invention is preferably not more than 5 parts by weight, per 100 parts by weight of the total amount of the resin of component (A).

If the amount of the polyorganosiloxane and/or the fluorine resin exceeds 5 parts by weight, defective phenomena such as a defective appearance of a molded product and an increase in the melt viscosity, are likely to result.

In the present invention, in addition to the phosphorus compound, the boron compound and the polyorganosiloxane and/or the fluorine resin, other conventional flame-retarding additives may be incorporated. Such flame-retarding additives are not particularly limited so long as they provide flame-retarding effects, and flame-retardants such as halogen compounds, antimony compounds, nitrogen compounds, metal oxides, metal hydroxides, carbonates and alkali (and alkaline earth) metal salts, may be used. Such flame-retardants may be used alone or in combination as a mixture of two or more of them.

The total amount of components (B), (C) and (D) of the flame-retardant resin composition of the present invention is preferably not more than 50 parts by weight, per 100 parts by weight of the resin of component (A). If the total amount exceeds 50 parts by weight, the heat resistance and the mechanical properties of the flame-retardant retardant composition tend to be poor.

In the flame-retardant resin composition of the present invention, the composition capable of providing an excellent balance of the flame-retardancy, the impact resistance and the flexural modulus of elasticity, comprises:

(A') 100 parts by weight of a polymer blend comprising from 50 to 95% by weight of a polycarbonate resin and from 5 to 50% by weight of a non-polycarbonate resin, (B') from 5 to 30 parts by weight of a phosphoric acid ester and/or a phosphorous acid ester, (C') from 5 to 20 parts by weight of zinc borate, and (D') from 0.1 to 5 parts by weight of a polyorganosiloxane and/or from 0.01 to 2 parts by weight of polytetrafluoroethylene.

There is no particular restriction as to the method of mixing the thermoplastic resin and the flame-retardant, and any means may be employed so long as it is capable of uniformly mixing them. For example, it is possible to employ kneading by means of an extruder or mixing by means of various mixing machines such as a Henshel mixer, a Banbury mixer and heat rolls. At that time, various additives such as a stabilizer, a releasing agent, a lubricant, a plasticizer, a ultraviolet absorber, light stabilizer, an antioxidant, a heat resistant stabilizer, an anti-aging agent, a dye or pigment, a filler and a compatibilizing component to improve the polymer blend properties, may be incorporated in appropriate amounts to provide the respective effects, as the case requires.

Now, the present invention will be described in further detail with reference to Examples. However, it should be understood that the present invention is by no means restricted by such specific Examples.

EXAMPLES 1 TO 7 AND COMPARATIVE EXAMPLES 1 TO 13

The components as identified in Table 1 were mixed in the proportions as identified in Table 1 by means of a Henshel mixer, and the mixture was melt-kneaded and extruded at a temperature of from 250° to 280° C. by means of a twin screw extruder of 30 mm in diameter (PCM-30, manufactured by Ikegai Tekko K.K.) and pelletized by a pelletizer.

A test piece was prepared from the pellets thereby obtained, by means of an injection molding machine, and the flammability and physical properties were evaluated. The results are shown in Table 1.

The oxygen index (OI) was measured in accordance with JIS K-7201.

For the UL flammability test, a flammability test piece having a thickness of 1.6 mm was prepared, and the flammability was measured in accordance with subject 94 (UL-94) by Underwriters Laboratory, U.S.A.

The impact strength was measured in accordance with JIS K-7110 with respect to a notched test piece having a width of 3.2 mm.

The flexural modulus of elasticity was measured in accordance with JIS K-7203.

The symbols used in Table 1 have the following meanings.
PC: Polycabonate resin (NOVAREX 7030PJ, manufactured by Mitsubishi Kasei Corporation)
ABS: ABS resin (GR-3000, manufactured by Denki Kagaku Kogyo K.K.)
TPP: Triphenyl phosphate (TPP manufactured by Daihachi Kagaku Kogyosho K.K.)
ZB: Zinc borate (Alkanex FRC-500, manufactured by Mizusawa Kagaku Kogyo K.K.)
NS: Sodium sulfate (reagent, manufactured by Wako Junyaku Kogyo K.K.)
PDMS: Polydimethylsiloxane (TSF451-1000, manufactured by Toshiba Silicone K.K.)
PTFE: Polytetrafluoroethylene (Teflon 6J, manufactured by Mitsui Dupon Florochemical K.K.)
OI: Oxygen index (in accordance with JIS K-7201)
UL94: UL94 flammability test evaluation
Izod: Izod impact strength (in accordance with JIS K-7110)

TABLE 1

|  | PC/ABS Parts by weight | TPP Parts by weight | ZB Parts by weight | NS Parts by weight | PDMS/PTFE Parts by weight | OI | UL94 | Izod kg-cm/cm$^2$ | Flexural modulus of elasticity kg/cm$^2$ |
|---|---|---|---|---|---|---|---|---|---|
| Example 1 | 75/25 | 10 | 10 | — | 0/0.2 | 31.6 | V-0 | 65.1 | 30,000 |
| Example 2 | 75/25 | 10 | 10 | — | 1/0 | 31.1 | V-0 | 64.5 | 30,000 |
| Example 3 | 100/0 | 10 | 10 | — | 0/0.2 | 41.2 | V-0 | 9.7 | 31,000 |
| Example 4 | 90/10 | 10 | 10 | — | 0/0.2 | 37.7 | V-0 | 13.6 | 31,000 |
| Example 5 | 80/20 | 10 | 10 | — | 0/0.2 | 34.5 | V-0 | 41.9 | 30,000 |
| Example 6 | 80/20 | 10 | 10 | — | 1/0 | 33.8 | V-0 | 42.4 | 30,000 |
| Example 7 | 70/30 | 10 | 10 | — | 0/0.2 | 30.7 | V-0 | 66.9 | 29,500 |
| Comparative Example 1 | 75/25 | — | — | — | 0/0 | — | B | — | — |
| Comparative Example 2 | 100/0 | — | — | — | 0/0 | 25.1 | V-2 | — | — |
| Comparative Example 3 | 75/25 | 10 | — | — | 0/0 | — | B | — | — |
| Comparative Example 4 | 75/25 | — | 10 | — | 0/0 | — | B | — | — |
| Comparative Example 5 | 75/25 | — | — | — | 1/0 | — | B | — | — |
| Comparative Example 6 | 75/25 | — | — | — | 0/0.2 | — | B | — | — |
| Comparative Example 7 | 75/25 | 10 | 10 | — | 0/0 | — | B | — | — |
| Comparative Example 8 | 75/25 | 10 | — | — | 1/0 | — | B | — | — |
| Comparative Example 9 | 75/25 | 10 | — | — | 0/0.2 | 26.6 | V-1 | 62.3 | 26,000 |
| Comparative Example 10 | 75/25 | — | 10 | — | 1/0 | — | B | — | — |
| Comparative Example 11 | 75/25 | — | 10 | — | 0/0.2 | — | B | — | — |
| Comparative Example 12 | 70/30 | 10 | — | 0.3 | 0/0.2 | 27.5 | V-0 | 63.1 | 26,000 |
| Comparative Example 13 | 75/25 | 10 | — | 10 | 0/0.2 | 25.0 | V-1 | 14.7 | 29,000 |

According to the present invention, a resin composition having excellent flame-retardancy and mechanical properties can be obtained. The flame-retardant resin composition thus obtained is suitable for use as material for housings and various parts of electric and electronic products and office appliances, for which flame-retardancy is required.

We claim:

1. A flame-retardant resin composition comprising the following components (A), (B), (C) and (D):
   (A) 100 parts by weight of a thermoplastic resin comprising ① a polycarbonate resin, or ② a polycarbonate resin and a non-polycarbonate resin,
   (B) from 0.1 to 40 parts by weight of a phosphorus compound,
   (C) from 0.001 to 40 parts by weight of a boron compound, and
   (D) from 0.01 to 5 parts by weight of a polyorganosiloxane and/or from 0.001 to 5 parts by weight of a fluorine resin.

2. The flame-retardant resin composition according to claim 1, wherein component (A) comprises from 50 to 95% by weight of a polycarbonate resin and from 5 to 50% by weight of a non-polycarbonate resin.

3. The flame-retardant resin composition according to claim 1, wherein the phosphorus compound is a phosphoric acid ester and/or a phosphorous acid ester, the boron compound is zinc borate, and the fluorine resin is polytetrafluoroethylene.

4. The flame-retardant resin composition according to claim 1, wherein the non-polycarbonate resin is an acrylonitrile-butadiene-styrene resin.

5. A flame-retardant resin composition comprising:
   (A') 100 parts by weight of a polymer blend comprising from 50 to 95% by weight of a polycarbonate resin and from 5 to 50% by weight of a non-polycarbonate resin,
   (B') from 5 to 30 parts by weight of a phosphoric acid ester and/or a phosphorous acid ester,
   (C') from 5 to 20 parts by weight of zinc borate, and
   (D') from 0.1 to 5 parts by weight of a polyorganosiloxane and/or from 0.01 to 2 parts by weight of polytetrafluoroethylene.

6. The flame-retardant resin composition according to claim 5, wherein the non-polycarbonate resin is an acrylonitrile-butadiene-styrene resin.

7. The flame-retardant resin composition according to claim 5, wherein the polymer blend comprises from 70 to 95% by weight of a polycarbonate resin and from 5 to 30% by weight of an acrylonitrile-butadiene-styrene resin.

8. The flame-retardant resin composition according to claim 7, wherein the acrylonitrile-butadiene-styrene resin is a graft polymer obtained by graft-polymerizing styrene and acrylonitrile to butadiene based elastomer or a polymer blend of that graft polymer and a styrene-acrylonitrile copolymer.

9. The flame-retardant resin composition according to claim 1, wherein component (D) is from 0.01 to 5 parts by weight of a polyorganosiloxane.

* * * * *